June 21, 1960  R. A. GILLETTE  2,941,606
MEANS FOR FACILITATING ATTACHING AND DETACHING AN
EARTH WORKING IMPLEMENT WITH RESPECT TO A TRACTOR
Filed Feb. 23, 1956  4 Sheets-Sheet 1

INVENTOR:
ROY A. GILLETTE
BY: Emerson B. Donnell
ATTORNEY

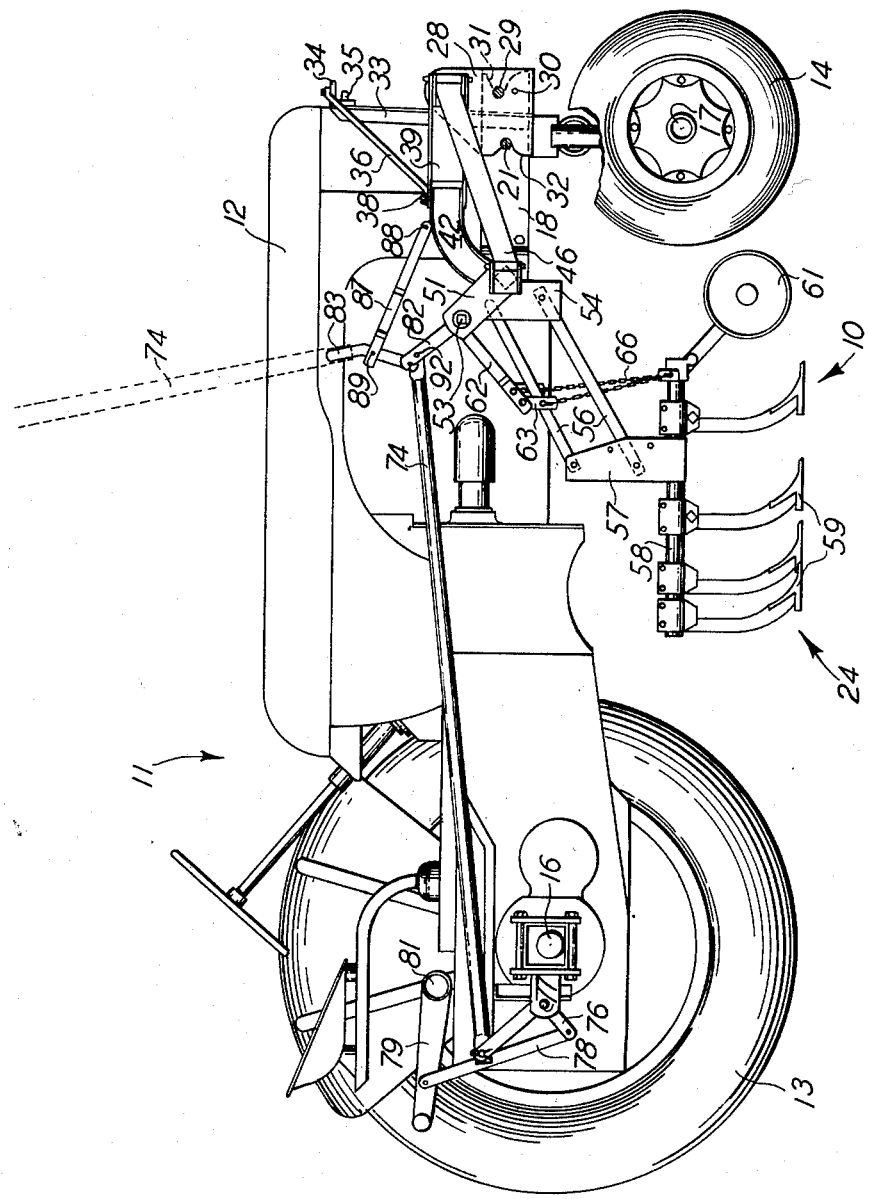

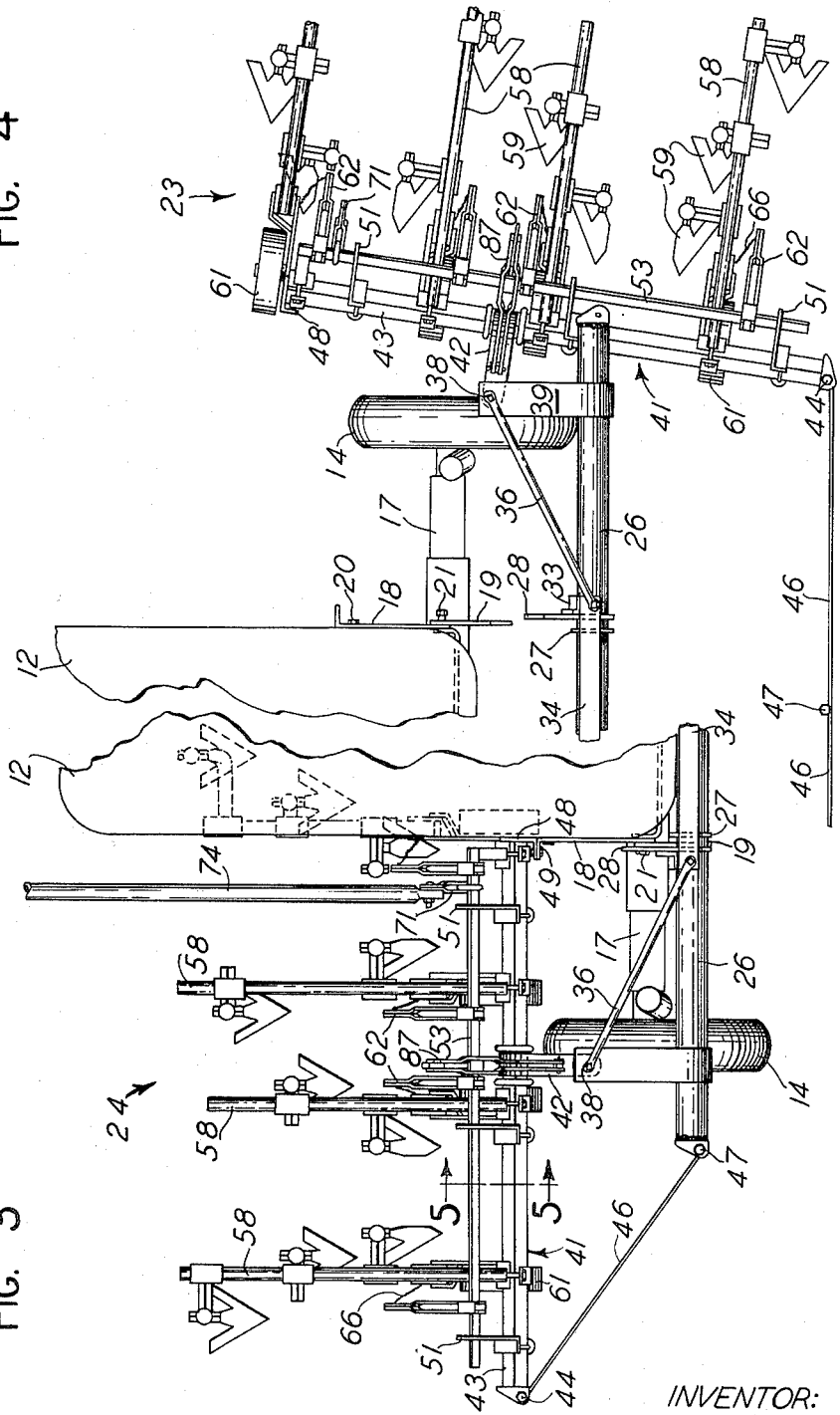

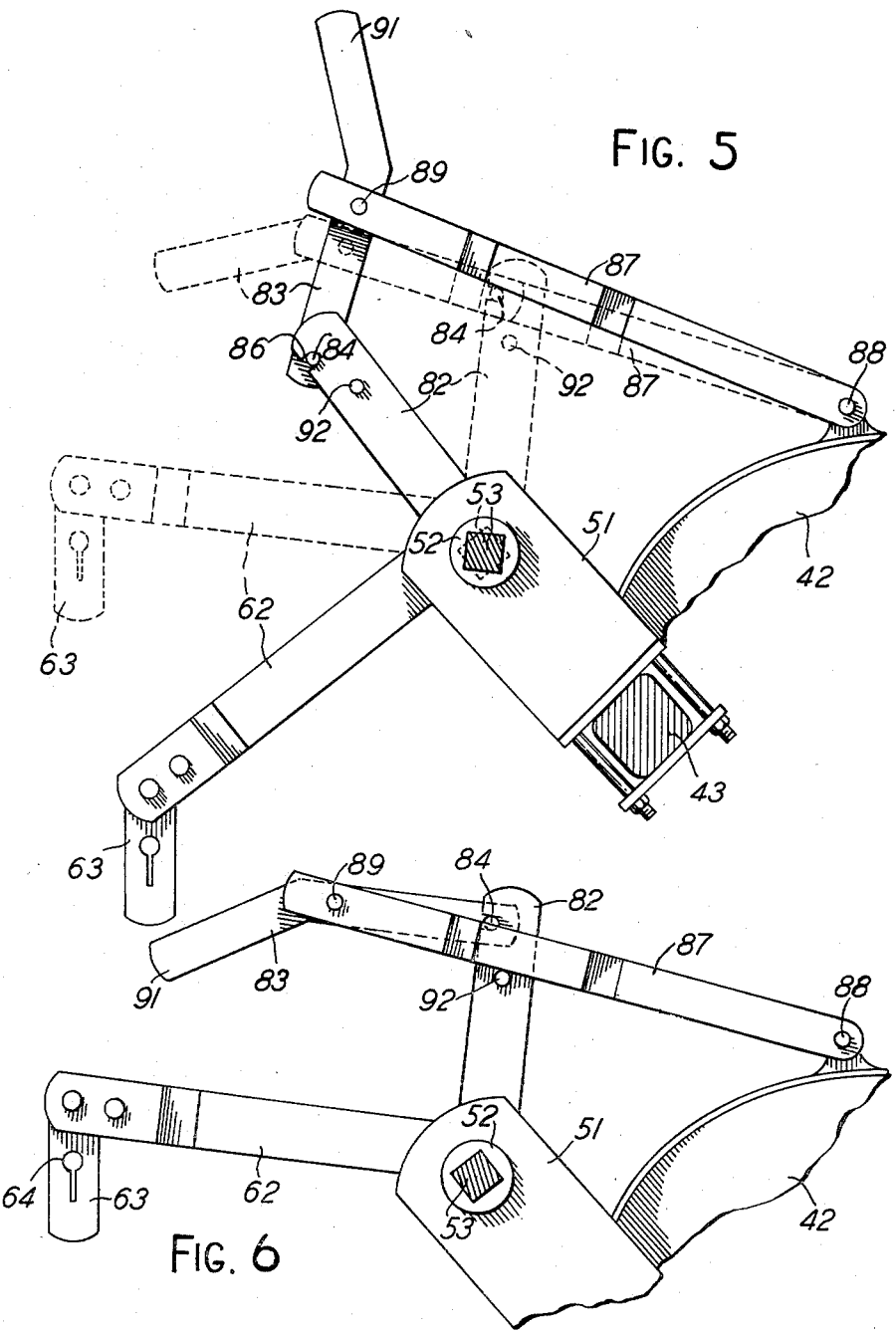

United States Patent Office 2,941,606
Patented June 21, 1960

2,941,606

MEANS FOR FACILITATING ATTACHING AND DETACHING AN EARTH WORKING IMPLEMENT WITH RESPECT TO A TRACTOR

Roy A. Gillette, Rockford, Ill., assignor to J. I. Case Company, Racine, Wis., a corporation of Wisconsin Filed Feb. 23, 1956, Ser. No. 567,216

7 Claims. (Cl. 172—273)

This invention relates to agricultural implements, and, more specifically, it relates to means for facilitating attaching and detaching of an earth working implement with respect to a tractor.

The drawings show the implement to be a cultivator, and, therefore, the description is accordingly directed and mention will be made of the application of this invention to a cultivator. There is a problem in attaching and detaching previously known cultivators to and from the front ends of tractors. Since the cultivators are necessarily large and heavy and, therefore, difficult to handle, previous constructions provide for swinging the two opposite rigs or gangs of cultivators to the sides of the path of the tractor. The tractor can then be driven into or out of position with respect to a frame supporting the rigs. If the tractor is driven into position, the rigs can then be swung around behind the tractor front wheels and be secured in the working position. Swinging of the rigs to clear the front wheels thus permits the tractor to move into and out of attaching position relatively to the cultivator. Because of the weight of the rigs, it is important that the rigs be balanced for the purpose of swinging them, and the operator should be relieved of the requirement of lifting the weight of the rigs. Such lifting is not only heavy work but it is dangerous since, if the rigs fall, the cultivator shovels or other parts might cause serious injury to the operator.

Of course the cultivator shovels must operate below ground level, and the shovels, therefore, are mounted on the rigs to be vertically movable to be in a raised position when the rigs are swung and to be in a lowered position when the cultivator is operating. Thus, means are provided to raise and lower the cultivator rigs in conjunction with the rig swinging movement mentioned.

It is an object of this invention to provide an earth working implement which can be easily and readily attached to and detached from a tractor with a minimum of effort. To accomplish this object, the earth working tools are mounted in a balanced condition for swinging across the path of the tractor which can then be driven into and out of attaching relation with the implement when the tools of the latter are swung out of the path of the tractor.

Another object of this invention is to provide an earth working implement which can easily be raised off the ground preparatory to swinging the tools of the implement across the path of a tractor which supports the implement.

Still another object of this invention is to provide a tractor mounted earth-working implement wherein the side rigs with the tools of the implement can be moved into and out of working positions and wherein the rigs can be secured in a stabilized position when the tools are in and out of working positions.

Still a further object of this invention is to provide a tractor and implement combination with attaching means whereby the tractor can be driven to the implement for attaching and the means provides self-alignment of the tractor and the implement when the two are moved together.

A further object of this invention is to provide a tractor mounted earth working implement which can be easily mounted and demounted with respect to either a tricycle tractor or a tractor having two spaced-apart and adjustable front wheels.

Other objects and advantages will become apparent upon reading the following description in conjunction with the accompanying drawings, wherein:

Fig. 2 is a reduced side elevation of the opposite side of the embodiment shown in Fig. 1 with parts removed and others broken away.

Fig. 3 is a plan view of a fragment of the embodiment shown in Fig. 2, with parts removed.

Fig. 4 is a plan view similar to the view of Fig. 3 but showing the side opposite to that shown in Fig. 3 and showing the implement detached from the tractor, and with the implement rig shown in a position swung out of the path of the tractor.

Fig. 5 is an enlarged view of a fragment of the embodiment shown in Fig. 2, being also a sectional view taken on the line 5—5 of Fig. 3. The dotted lines in Fig. 5 show another position of the movable parts shown in the view.

Fig. 6 is a view similar to Fig. 5, but with the movable parts thereof shown in still another position.

The same reference numerals refer to the same parts throughout the several views.

Figure 1:
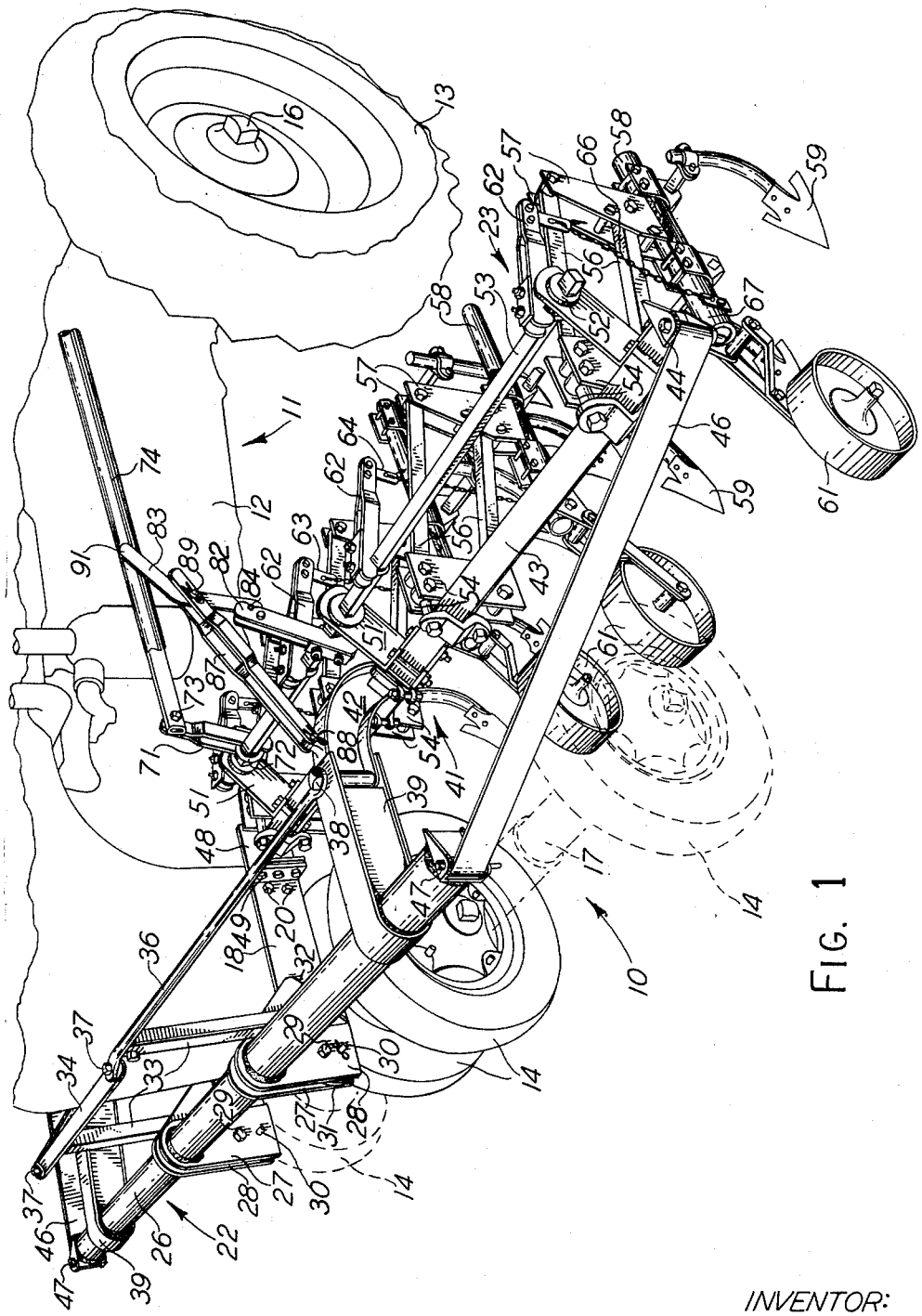
Fig. 1 is a front perspective view of a preferred embodiment of this invention attached to a tractor fragmentarily shown.

Fig. 1 shows a preferred embodiment of an earth working implement, generally designated 10, suitably attached to a conventional tractor 11. The latter consists of the tractor body 12 supported on the usual rear wheels 13 and front wheels 14. The usual rear wheel axle 16 and front wheel axle 17 are also shown. At this time it should be noted that the front wheels 14 may be positioned, as shown in solid lines in Fig. 1, or the tractor may be provided with front wheels 14, as shown in dotted lines in Fig. 1, and spaced laterally from the solid line position of the wheels. Thus, as is customary, the tractor 11 may be provided with either the adjacent front wheels 14 positioned together to form what is termed a tricycle tractor or the front wheels may be spaced apart to form what is termed the spaced-apart front wheel tractor. The spacing of the front wheels 14 is significant with regard to the swinging of the rigs or gangs of tools since the spaced-apart condition requires the rigs to be swung further to clear the path of the front wheels, as will be more apparent later.

Figs. 1, 2, 3, and 4 show an angle plate 18 suitably bolted, by bolts 20, to the front and opposite sides of the tractor body 12. The front end of the plate 18 supports a plate 19, the latter being suitably attached to the plate 18 and having a bolt 21 disposed substantially on the center line of the plates, as shown particularly in Fig. 2 and Fig. 4. The drawings also show the implement 10 to consist generally of a fixed or main frame 22 with two implement rigs or gangs 23 and 24, shown in Figs. 3 and 4, swingably mounted on the frame 22 in a manner described later. The frame 22 includes a horizontally disposed beam or cross frame 26 which has welded thereto two pairs of juxtaposed plates 27 and 28. The latter plates depend from the member 26 and are positioned thereon to be disposed laterally with respect to the plate 19 on the tractor, as shown in Figs. 3 and 4. It will be noted that the plates 27 and 28 support an alignment bolt 29 for a purpose mentioned later. It will also be noted in Fig. 2 that the front end of the tractor plate 19 is provided with a cradle or V-shaped edge or notch 31, and the rear edge 32 of the frame plate 28 is similarly shaped. With this arrangement, it should be understood that when the tractor is advanced toward the implement, as indicated in Fig. 4, the notches of the plates 19 and 28 respectively snugly engage the bolts 29 and 21 to vertically align the implement with respect to the tractor as the alignment is accomplished by virtue of the cradle or V-shaped edges described. The plates 19 and 28 are thus alignment plates and as such they simplify the attaching procedure. When the tractor plate 19 is disposed between the plates 27 and 28, a pin 30 is placed in aligned holes on all three of the plates and the latter are thus fastened together in a well-known manner.

The frame 22 also includes two angle irons 33 which are suitably attached to the plates 27 and 28 to extend vertically therefrom with a front supporting bar 34 connecting the upper ends of the angles 33. The bar 34 is secured to the front of the tractor by a bolt 35. A tie rod 36 is attached to the bar 34 by a bolt 37, and the rod 36 extends downwardly to attach through a pivot bolt or pin 38 to a rearwardly extending portion 39 which is fixedly attached to the frame member 26. The alignment plates 19 and 28, and the rods 36, both serve to secure the implement fixed frame to the tractor at the desired angle and position. It will be noted that the rear ends of the portions 39 attach through the pivot bolts 38 to rig frames 41. A forwardly extending arm 42 is included in the rig frame 41 and it is preferably shaped as shown to fixedly support a square shaped beam or tool bar 43 positioned to be disposed horizontally and transverse to the path of tractor movement when the implement is in the operating position. The laterally outer end of the member 43 suitably supports a bolt 44 to which a diagonal brace 46 is pivotally attached. The opposite and forward end of the brace 46 is attached to the end of the member 26 through a bolt 47. At this time it will be noted that the two braces 46 are joined at their inner ends by one of the bolts 47, as shown in Fig. 4, when the rig 23 is swung to the Fig. 4 position. Thus, the braces 46 serve as stabilizers or supports for securing the rigs in the non-operating position shown in Fig. 4.

The laterally inner end of the bar 43 has an angle plate 48 suitably attached thereto so that the angle 48 presents a matching surface for the rearward end of the tractor plate 18, as best shown in Figs. 1 and 3. Thus, the juxtaposed ends of the plates 18 and 48 contain aligned bolt holes through which suitable bolts 49 pass to secure the plates 18 and 48 together and, therefore, secure the rigs 23 and 24 to the tractor at those points.

The members 43 suitably support the earth working tools as shown and as described in the following. A plurality of support plates 51 are fixedly bolted to the member 43 to project upwardly and rearwardly therefrom in the Fig. 1 position. The upper ends of the plates 51 contain circular bearings 52 having square openings for receiving a square cross-sectionally shaped rock shaft 53. The latter is thus horizontally and transversely disposed with respect to the tractor when the implement gangs are in the Fig. 1 working position. It will be noted that the member 43 also has pairs of plates 54 which extend rearwardly of the member 43. The rear ends of the bars 56 are suitably attached to the plates 57, as shown, and the bars 56 are pivotal at their front ends with respect to the plates 54 and at their rear ends with respect to the plates 57. Fig. 1 further shows that the lower ends of the plates 57 support tool bars 58 which are substantially horizontally disposed and which in turn suitably support depending earth working tools such as the shown cultivator shovels 59. Also, the front ends of the tool bars 58 support ground engaging wheels 61 for the usual purpose of guiding the cultivator shovels during operation of the latter. The mounting of the cultivator shovels is accomplished in a conventional and well-known manner and, therefore, no further description of the mounting and construction is necessary for a full and complete description of this invention.

It will be noted that the rock shaft 53 has a plurality of arms 62 bolted thereto with the arms extending rearwardly from the shaft 53, and the arms are rotatable with the shaft 53. The rear end of each arm 62 has a link 63 attached to it, and the link 63 is shown to include a keyhole slot 64 into which a chain or flexible connector 66 is engaged to depend therefrom and connect to the tool bar 58 through a plate 67 attached to the bar 58. With this construction, it should be understood that rotation of the rock shaft 53 determines the vertical positions of the tool bars 58 and, therefore, the vertical positions of the shovels 59 and the wheels 61. This is true since rotation of the shaft 53 causes the arms 62 to be correspondingly rotated to raise the bars 58 as the parallel bars 56 pivot at their ends, as mentioned, to permit the vertical movement of the bars 58 while maintaining lateral stability of the bars 58. Because of the flexible connectors 66, the shovels 59 are limited in their downward movement but they are free to rise under the forces of cultivating. Here, too, the precise construction is conventional and need not be further described.

As shown in Figs. 1, 2, and 3, an arm 71 is secured to the rock shaft 53, by means of a U-bolt 72, and the arm 71 extends transversely from the shaft 53 and it rotates with the shaft 53. The end of the arm contains a suitable hole which receives a bolt or pin 73 providing a means for pivotally connecting the arm 71 to a power lift link 74. The latter is shown in Fig. 2 to extend to the rear of the tractor and be suitably connected to the usual power lift mechanism of the tractor. Thus, a rigid L-shaped link 76 is pivoted on the tractor through a pin 77, suitably mounted on the tractor, and the link 76 pivotally connects with a second link 78, as shown. A power lift arm 79 is provided and it also pivotally connects with the link 78 at the upper end of the latter. The arm 79 is mounted on the tractor power lift rock shaft 81. Since power lift mechanisms and the linkage connection described are of a conventional design, no further description thereof is necessary to disclose the operative connection between the tractor rock shaft 81 and the power lift link 74. It should be understood that the usual rotation of the rock shaft 81 will cause the power lift link 74 to be axially displaced and thereby rotate the rock shaft 53 through the arm 71. By this means the operator is able to raise and lower the cultivator shovels 59 during operation of the cultivator since, as previously described, rotation of the shaft 53 causes the shovels to be raised or lowered.

Also bolted to the shaft 53 is an upstanding arm or link 82 which is secured to the shaft 53 to rotate therewith. The arm 82 is actually composed of a pair of links, as shown in Fig. 1, and an angular lever or link 83 is thus disposed between the two links of the arm 82 to be pivotally connected thereto through a pin 84, on the lever 83, being received in a suitable hole 86 in the arm 82. Another link 87 is pivotally attached to the portion 42 of the rig frame by the pivot pin 88. The rearwardly projecting end of the link 87 is pivotally connected to the intermediate portion of the lever 83 by means of a pin 89. It will be noted that the link 87 is preferably made of two members which include offset or spaced-apart intermediate portions, as shown in Fig. 1. With the linkage described, the power lift link 74 can be readily removed from its position shown, and the link can be slipped over the projecting end 91 of the lever 83, and the link 74 thus provides an extension for the lever 83. This arrangement is indicated by dotted lines in Fig. 2, but actually the link 74 would be more nearly horizontal since the operator would actuate the tractor power lift to raise the shovels 59 from their operating position of Fig. 2 prior to connecting the link 74 with the lever 83. It should be understood that the link 74 is suitably formed at either end to receive the projecting end 91 of the lever 83, and the link 74 and lever 83 have interengaging portions since the link 74 telescopes over the end 91 of the lever 83. When the link 74 is positioned on the lever 83, the operator can pull downwardly on the rear end of the link 74 and, by virtue of the mechanical advantage obtained in the extension provided, the lever 83 will be pivoted about the pin 89, and the link 87 will serve as a fulcrum link as the rig is raised through rotation of the shaft 53.

Figs. 5 and 6 show the progressive positions of the linkage and the resultant rotation of the rock shaft 53 as the operator exerts a downward force on the newly positioned link 74. Fig. 5 shows in solid lines the original position of the linkage and the shaft 53 while the dotted lines of Fig. 5 show the position of the members after the lever 83 has been depressed a certain amount. The pin 88 and shaft 53 respectively provide fixed pivot points for the link 87 and the arm 82. In the dotted position, the pins or pivot points 89, 84, and 88 are aligned in a dead center position. Of course, at this time the arm 62 has been rotated from the lower solid line position to the raised dotted line position because the shaft 53, with its bearing 52, has been rotated from its solid line position through approximately forty-five degrees to its dotted line position. The tool bars 58 have then been raised a distance corresponding to the vertical displacement of the link 63 since the latter is connected with the bars 58. Depressing the lever 83 beyond the dotted position of Fig. 5 to the position shown in Fig. 6 further moves the parts as indicated and particularly causes the pin 84 to pass the dead center position mentioned. It should be noted that the arm 82 has a stop pin 92 which is disposed as shown to project laterally of both sides of the arm 82 and thus provide a support or stop for the fulcrum link 87 when the latter has pivoted to where its lower edges abut the two ends of the pin 92, as shown on one side in Fig. 6. Since the weight of the tools urges the rock shaft 53 to rotate in a counter-clockwise direction, as viewed in Figs. 5 and 6, the arm 82 is similarly urged in a counter-clockwise direction, but, of course, the fulcrum link 87 and the lever 83 prevent the arm 82 from rotating and, therefore, the tools are secured in a raised position off the ground. In accomplishing the final locked position, it will be noted that the arm 82 projects between the two spaced-apart sections of the fulcrum link 87, and the latter then rests on the arm pin 92 on both sides of the arm 82 since the pin 92 preferably projects beyond both sides of the arm. A lifting force applied to the end 91 of the lever 83 will, of course, cause the linkage to return to its original position, and the shovels 59 will thus be lowered to their operating positions. In this arrangement, the arm 82 and the lever 83 form a toggle.

The reason for raising the gangs or rigs in the manner described above is to permit easy swinging of the rigs to attach or detach the implement with respect to the tractor. Thus, when the rigs are in the raised position, the bolts 47 are removed to free the inner ends of the braces 46, and the bolts 49 are removed to free the plates 48, and the rigs are then free to swing or pivot about the bolts 38 from the position shown in Fig. 1 to that shown in Fig. 4. It will thus be obvious that the rigs are thus clear of the path of the tractor and, particularly the front wheels 14 of the tractor, and, therefore, the tractor can be moved toward or away from the cross frame 26. Fig. 4 shows the tractor unattached to the fixed or cross frame of the implement, and it is believed that the utility of the construction is obvious. Of course, when the tractor is no longer supporting the implement, suitable standards are utilized for supporting the implement in an upright position. It should be noted that the pivot 38 is substantially centrally located along the rigs 23 and 24, and, therefore, the rigs are substantially balanced on the cross frame.

While a specific embodiment of this invention has been shown and described, it should be obvious that numerous deviations could be effected and, therefore, the scope of this invention should be limited only by the appended claims.

I claim:

1. In a tractor mounted implement adaptable to swing into removal facilitating position, the combination of ground engaging tools included in said implement and including a first rock shaft, arms on said rock shaft, a second rock shaft on said tractor, an arm on said second rock shaft on said tractor, a power lift link connecting one of said arms and said arm on said tractor, a lever having one end pivoted to the other of said arms on said first rock shaft, a fulcrum link pivoted to the implement and to the lever intermediate the ends thereof, means for removing said power lift link prior to swinging of said implement, said lever and said power lift link having interengaging portions for extending said lever, when engaged, to the extent of the length of said power lift link, said lever, when swung in a direction to swing said arm for raising said tools, moving toward a position in alignment with said fulcrum link, further swinging moving said lever past said fulcrum link, and stop means to prevent further movement of said lever so that the other of said arms is held in position to support said tools by said link and said lever.

2. In a tractor mounted earth working implement, the combination of a tractor, a rig frame mounted on either side of said tractor, a rock shaft on said implement, an upwardly directed arm on said rock shaft, a lever pivoted on the upper end of said arm, a fulcrum link pivoted at one end to said lever above the pivotal connection with said arm, the opposite end of said link being pivotally anchored to said rig frame whereby rocking said lever in one direction will rock said arm in the other direction, the lever, link, and arm being proportioned so that rocking a sufficient amount will align the pivot on the arm with the pivots on the fulcrum link in dead center relation, further movement carrying the pivot between said lever and said fulcrum link past the position of alignment whereby the resistance of the load on said arm tends to rock the lever still further, and stop means to prevent further movement of said lever so that said arm is held in position to support said tools by said link and said lever.

3. In a tractor mounted earth working implement the combination of a tractor, a cross frame member transversely disposed on the tractor at the front thereof, rearwardly extending portions on said cross frame member spaced outwardly from the tractor on either side thereof, a rig frame on either side of the tractor, each rig frame having a forwardly extending arm, a pivotal connection between each of said rearwardly extending portions and each forwardly extending arm for lateral swinging movement of said arms and rig frames on said cross frame, ground engaging tools fixed on said rig frames and extending downwardly to contact the ground, means detachably connecting said cross frame member to the tractor, bracing means connecting said rig frames to said cross frames for securing said rig frames against said swinging movement, said bracing means being connectable to each other in one position of said rig frames, when detached from said tractor, to form, with said rig frames and said cross frame member, a substantially rigid, stable, self-sustaining unit from which said tractor may be driven.

4. In a tractor mountable implement, the combination of a fixed implement frame, a rock shaft rotatably disposed on said frame, earth working tools connected to said rock shaft to depend therefrom to engage the ground in one rotated position of said shaft and when said implement is mounted on said tractor, an arm attached to said shaft and extending transversely therefrom to be rotatable therewith, a first link pivotally mounted on said frame, a second link pivotally attached to the free end of said arm and to the free end of said first link, said arm and said links being arranged to have said arm and said second link form a toggle, and means engageable between said arm and said first link for limiting the pivotal movements of said arm and each said link in a rotated position of said rock shaft when the latter is rotated to elevate said tools above the ground.

5. In a tractor mountable implement, the combination of a fixed implement frame, a rock shaft rotatably disposed on said frame, earth working tools connected to said rock shaft to depend therefrom to engage the ground in a first rotated position of said shaft and when said implement is mounted on said tractor, an arm attached to said shaft and extending transversely therefrom to be rotatable therewith, a fulcrum pivotally mounted on said frame, a lever pivotally attached at one end thereof to the free end of said arm and at an intermediate portion thereof to the free end of said fulcrum, said arm and said fulcrum and said lever all being arranged to have said arm and said lever form a toggle, the opposite end of said lever projecting transversely with respect to said rock shaft, and means engageable between said arm and said fulcrum for limiting the pivotal movements of said toggle when said shaft is rotated away from said first rotated position to elevate said tools above the ground.

6. In a tractor mountable implement, the combination of an implement frame including means for attaching to said tractor, a rock shaft rotatably supported by said frame, earth working tools connected to said shaft to be offset radially thereof in a manner to have the weight of said tools urge said rock shaft to rotate in a first direction of rotation, said frame and said rock shaft and said tools all being arranged for the latter to engage the ground when said rock shaft is rotated in said one direction to a selected position, an arm fixedly attached to said rock shaft and extending transversely therefrom, a fulcrum pivotally mounted on said frame, a lever pivotally attached to said arm and said fulcrum to connect the latter two together and form a toggle therewith, said toggle being arranged for movement to a position beyond dead center relation of said toggle by rotation of said arm and said rock shaft in a direction of rotation opposite to said first direction of rotation for elevating said tools from the ground, and stop means engageable with said toggle for locking the latter in said position beyond dead center for securing said rock shaft in a limited position of rotation against the urging of the weight of said tools.

7. In a tractor attachable earth working implement, the combination of a vertically disposed implement attaching plate mounted on the front end of said tractor and having a forwardly opening V-shaped first cradle, a horizontally disposed alignment pin attached to said implement attaching plate rearwardly of said first cradle and projecting laterally of said plate, an implement cross frame included in said implement, a vertically disposed tractor attaching plate mounted on said cross frame and having a rearwardly opening V-shaped second cradle, a horizontally disposed alignment pin attached to said tractor attaching plate forwardly of said second cradle and projecting laterally of said tractor attaching plate, said pin and said cradle on each said plate being spaced apart the same distance, both said plates being mounted to dispose each said pin in the base of one of each said cradles when said implement and said tractor are in position for attaching together, and each said pin and each said cradle being constructed and arranged for vertically aligning together when said tractor and implement are moved into attaching position.

References Cited in the file of this patent

UNITED STATES PATENTS

| | | |
|---|---|---|
| 946,815 | Yorke | Jan. 18, 1910 |
| 2,274,769 | Zink et al. | Mar. 3, 1942 |
| 2,423,148 | Johnson | July 1, 1947 |
| 2,560,702 | Reaves | July 17, 1951 |
| 2,584,217 | Morkoski | Feb. 5, 1952 |
| 2,626,549 | Silver et al. | Jan. 27, 1953 |
| 2,777,377 | Johnson et al. | Jan. 15, 1957 |